United States Patent [19]

McDonald

[11] Patent Number: 5,148,506
[45] Date of Patent: Sep. 15, 1992

[54] OPTICAL CROSSBAR SWITCH

[75] Inventor: T. Gus McDonald, Plano, Tex.

[73] Assignee: Texas Instruments Incorporated, Dallas, Tex.

[21] Appl. No.: 807,954

[22] Filed: Dec. 10, 1991

Related U.S. Application Data

[63] Continuation of Ser. No. 742,450, Aug. 5, 1991, abandoned, which is a continuation of Ser. No. 691,763, Apr. 26, 1991, abandoned.

[51] Int. Cl.$^5$ ............................ G02B 6/00; G02B 6/36
[52] U.S. Cl. ........................................................ 385/16
[58] Field of Search ............................ 350/96.11–96.14

[56] References Cited

U.S. PATENT DOCUMENTS

| | | | |
|---|---|---|---|
| 4,130,342 | 12/1978 | McMahon | 350/96.13 |
| 4,693,547 | 9/1987 | Soref et al. | 350/96.13 |
| 4,795,225 | 1/1989 | Saki et al. | 350/96.13 |
| 4,811,210 | 3/1989 | McAulay | 364/200 |
| 4,856,863 | 8/1989 | Sampsell et al. | 350/96.16 |
| 4,859,012 | 8/1989 | Cohn | 350/96.24 |
| 4,887,877 | 12/1989 | Inoue et al. | 350/96.13 X |

FOREIGN PATENT DOCUMENTS

| | | | |
|---|---|---|---|
| 0173078 | 6/1982 | Japan | 350/96.13 |
| 5173086 | 6/1982 | Japan | 350/96.13 |
| 59-96442 | 11/1985 | Japan | 350/96.13 |

*Primary Examiner*—Akm E. Ullah
*Attorney, Agent, or Firm*—Julie L. Schneider; James C. Kesteron; Richard L. Donaldson

[57] ABSTRACT

There is disclosed a micro-mechanical switch mounted on a waveguide structure that can be utilized as a switching device in optical networks. The device comprises an individually deflectable element suspended over a gap in a waveguide. The individually deflectable element has attached to its underside a vertical metal shutter which can be raised or lowered by the movement of the element. The raising or lowering of the shutter is used to control light propagating through the waveguide.

8 Claims, 7 Drawing Sheets

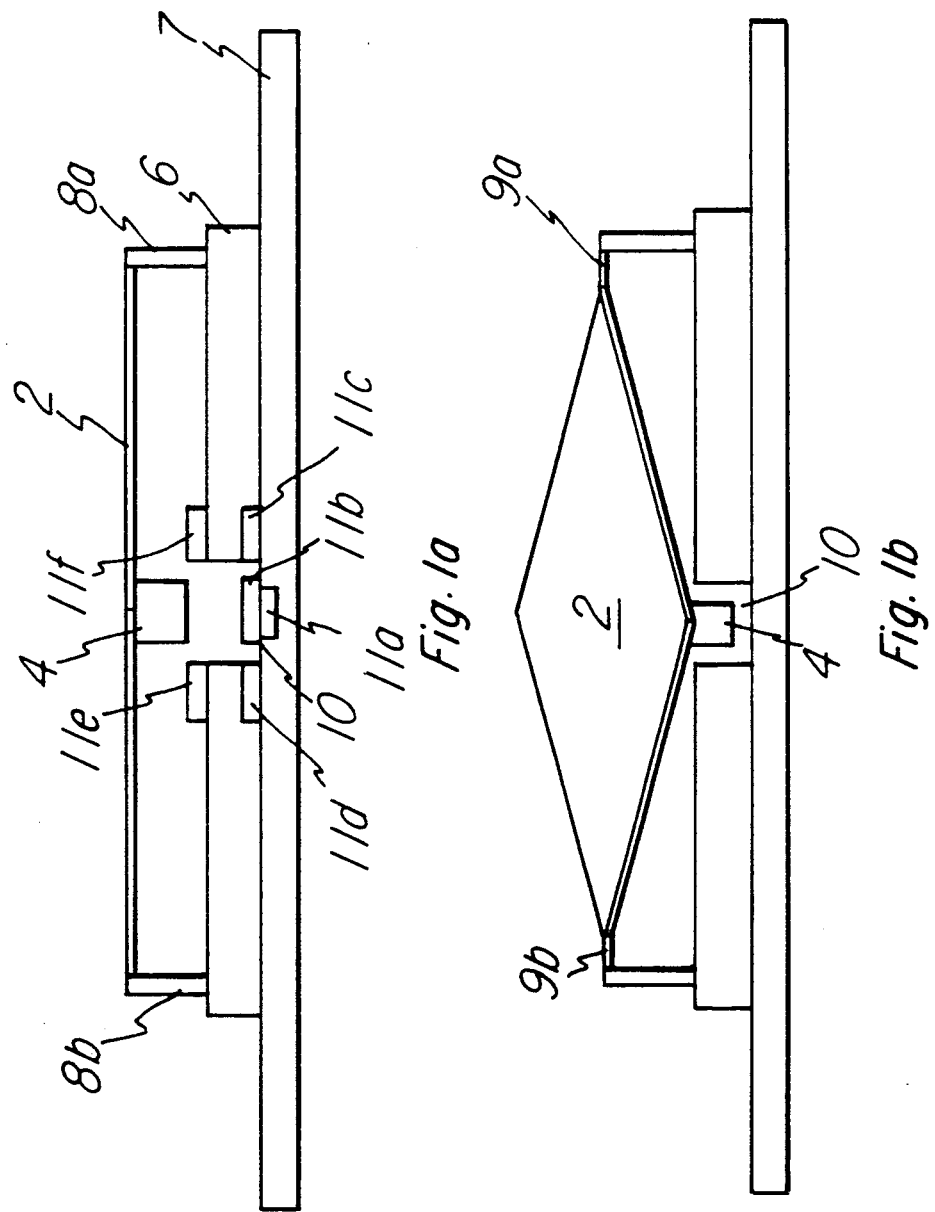

1

OPTICAL CROSSBAR SWITCH

This application is a continuation of application Ser. No. 07/742,450 filed Aug. 5, 1991, which is now abandoned, which is a continuation of application Ser. No. 07/691,763 filed Apr. 26, 1991, now abandoned.

BACKGROUND OF THE INVENTION

1. Field of the Invention

This invention deals with optical crossbar switches, more specifically with structures similar to deformable mirror devices used as crossbar switches.

2. Background of the Invention

The demand for high-speed parallel computing has given rise to a need for high-speed reconfigurable switching networks to control the flow of information. Optical transmission provides the high speeds necessary to fully use the capabilities of a parallel processor. Reconfigurable switching networks can be achieved with programmable crossbar switching.

Crossbar switches allow any one of N inputs to be connected to any one of M outputs. This can be accomplished in many different ways, one of which is to use spatial light modulators, such as deformable mirror devices, to reflect the light from one path to another. The light enters one port and would, if unmodulated, travel out another port. If the deformable mirror device is deflected, the light is either reflected back along its input port or switched to yet another port as output.

The number of such switches that are connected together determines how many possible combinations of input to output connections can be made. This entails each switch with its necessary beam splitters and combiners, and with its spatial light modulator. The resultant network is somewhat unwieldy. Additionally, to fabricate such a network in a production setting is difficult and expensive.

SUMMARY OF THE INVENTION

Objects and advantages will be obvious, and will in part appear hereinafter and will be accomplished by the present invention which provides a structure for optical crossbar switching. The structure consists of a network of waveguides, with metal elements, to which a vertical metal structure is attached, suspended over the junctions in the waveguides. The junctions have gaps etched in them. Located in or under the waveguide structure is an electrode which, when electrically addressed, electrostatically attracts the metal element which is suspended on hinges. The metal element deflects on its hinges towards the electrode thereby lowering the vertical metal structure into the waveguide gap. The light in the waveguide can thereby be guided or split by the metal structures.

BRIEF DESCRIPTION OF THE DRAWINGS

FIGS. 1a and 1b show a metal shutter structure.

DETAILED DESCRIPTION OF THE PREFERRED EMBODIMENT

Figure 1C:
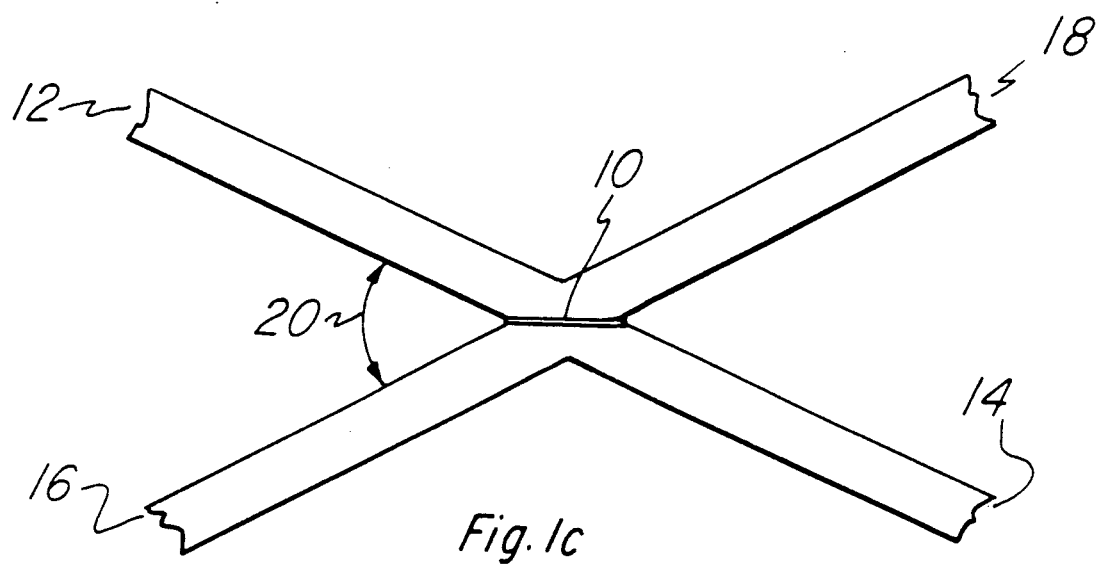
FIG. 1c shows a crossing waveguide structure.

Presently available deformable mirror devices offer an opportunity in crossbar switching that has not existed before. A deformable mirror device (DMD) that consists of a metal element suspended on one or more support posts over an air gap, at the bottom of which there is an electrode, can be used as a light switching device. The manufacturing process can be altered so the metal element, which deflects downwards towards the electrode, when the electrode is electrically addressed, can have a vertical structure attached to its underside. The result is a metal structure that can be raised and lowered quickly and easily to position the vertical shutter to allow or prevent the transmission of light.

One of these structures is shown in FIG. 1a. The metal element 2 is suspended on posts 8a and 8b over waveguide 6. The shutter structure 4 attached to the metal element is shown as hanging over the air gap 10. This embodiment of a deformable mirror device, where the metal element is supported by two posts, is called the torsion beam. Alternately, the shutter could be attached to a DMD that is supported on one side, the cantilever beam, or one that is supported on four sides, the flexure beam. All of these embodiments operate in the same manner.

In FIG. 1b, the operation of the shutter is demonstrated. In the torsion beam DMD, there are typically two addressing electrodes, which are normally located adjacent the air gap. Some possible locations of these electrodes are shown in positions 11a-11f. When one of the electrodes is addressed, the metal element tips towards that electrode, torquing around the beam formed by hinges 9a and 9b. This causes the metal shutter 4 to tip into the waveguide gap 10 and prevent the transmission of light. Alternately, the shutter could be manufactured to be in the gap in the unaddressed state, and when the electrode on the other side is addressed, and the metal element tips away from the gap, the shutter would be removed from the gap allowing the transmission of light. For explanation purposes, the shutter will be assumed to be out of the gap in the unaddressed, or OFF state.

An application of this structure in optical switching is shown in FIG. 1c. The crossing structure consists of two input ports, 12 and 16, a shutter gap 10, and two output ports 14 and 18. The angle 20 can be calculated for maximum power throughput, as can the thickness of shutter gap 10. In all of the following embodiments, only the shutter gap is discussed, but the understanding is that the gaps will be filled with devices as discussed above.

Figure 2:
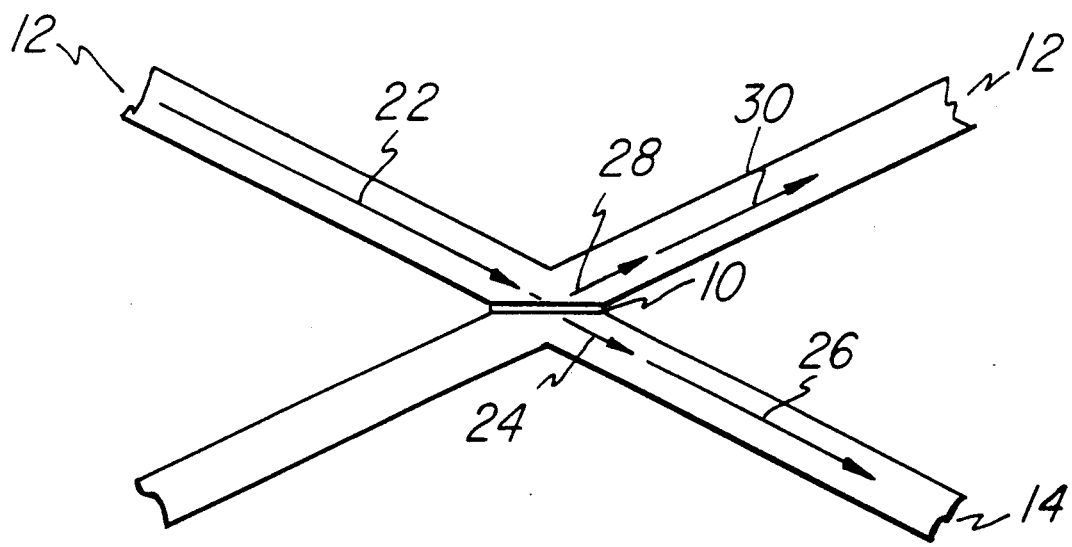
FIG. 2 shows two of the states of a crossing waveguide structure.

Two of the states of the crossing structure are shown in FIG. 2. In this figure, only two waveguides are shown. It is possible to have more than two. If light enters the structure through port 12, it propagates in the direction of the arrow 22. If the shutter gap 10 is in the unaddressed, "OFF", state, the light follows arrows 24 and 26 and exits the switching structure at port 14. This is the cross state. If the electrode under the shutter gap 10 is addressed, the shutter lowers and causes the light that was propagating in the direction of the arrow 22 to reflect off of the shutter in gap 10 and follow arrows 28 and 30 to exit the structure at port 18. This is the bar state.

Figure 3A:
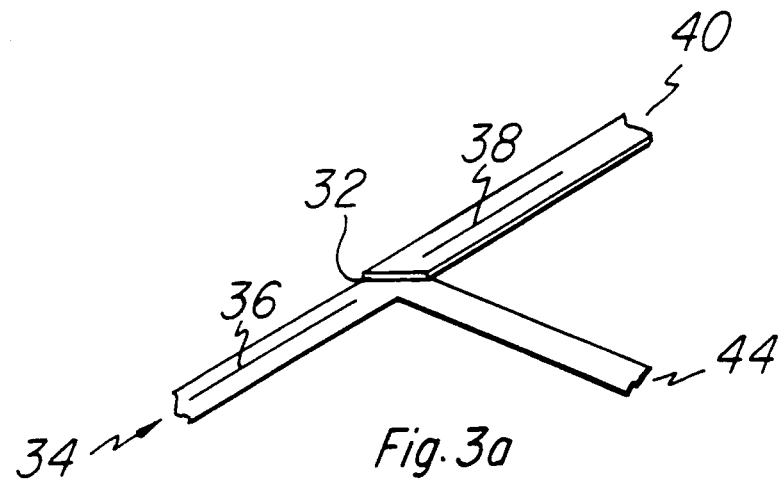
FIGS. 3a and 3b shows a variation of the crosspoint switch.
Figure 3B:
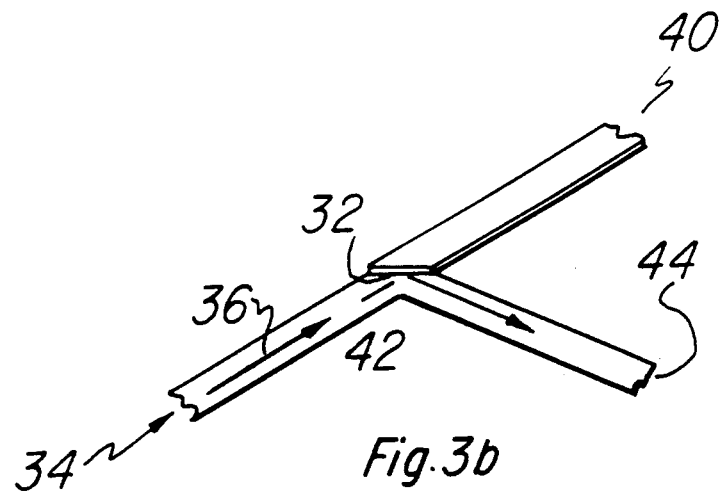

FIGS. 3a and 3b show a variation of this crosspoint switching. In this embodiment, there is only one input port and two output ports. When the shutter gap 32 is open, the light enters the switch through port 34 and propagates in the direction of the arrow 36, continuing in the direction of the arrow 38 and exits port 40. This state is shown in FIG. 3a. In FIG 3b, the shutter gap 32 is blocked. When the light enters port 34, it reflects off of the shutter in gap 32 and is directed in the direction of the arrow 42 and exits the port 44. An alternative is to only partially lower the shutter, possibly by using less voltage on the addressing electrode, forming a variable ratio splitter, with the amount of power going to ports 40 and 44 dependent on how much of the beam is deflected by the shutter.

Figure 4:
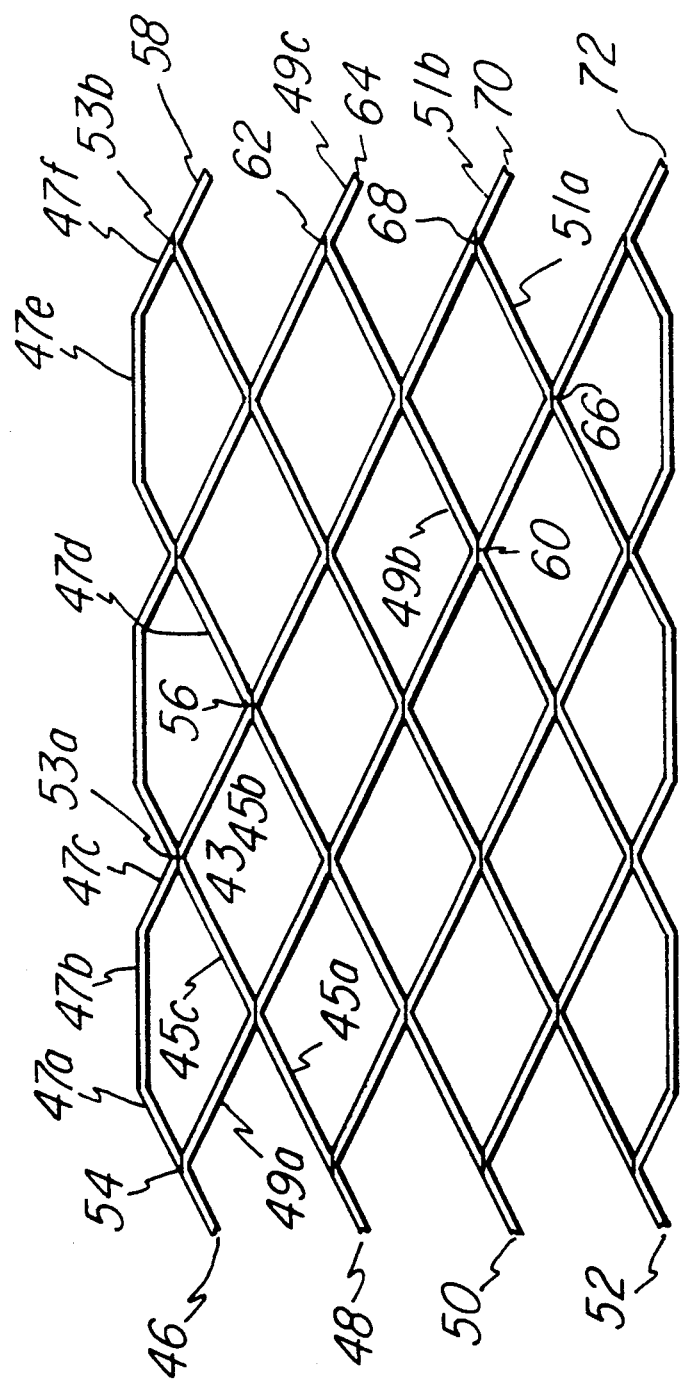
FIG. 4 shows an example of a switching network.

The structures from FIGS. 2, 3a and 3b can be connected together to form a switching network such as the four-by-four crossbar in FIG. 4. Here a combination of the two above structures is used. The structure consisting of port 46, shutter gap 54, and paths 47a and 49a is the one input port, two output port structure from FIGS. 3a and 3b. The structure consisting of paths 49a, 45a, 45b and 45c, with the shutter 43 is the crossing waveguide structure from FIG. 2. In this configuration, the light entering any of the ports 46, 48, 50 or 52 could exit any of the ports 58, 64, 70 or 72.

Many combinations of raised and lowered shutters can achieve this. For example, light entering port 46 could exit port 58 as follows. The light would be passed along path 47a if shutter gap 54 is open. The light would then travel from 47a to 47b to 47c. The shutter gap 53 is left open and the light travels in the direction of path 47c until it encounters shutter gap 56 which is blocked. The light is then directed along path 47d to paths 47e and 47f. The shutter gap 53b is left open and the light exits port 58.

Transmission of light from port 46 to port 64 could be accomplished similarly. In this instance, light entering port 46 would be guided along path 49a if shutter gap 54 is blocked. The light follows a straight line along the direction of path 49a until it reaches shutter gap 60, which is also blocked. The light is then guided in the direction of path 49b, and continues in that direction until it contacts shutter gap 62. Shutter gap 62, in the blocked mode, will deflect the light along path 49c and out port 64.

In the same manner as the transmission to port 64, light can be directed to port 70. In this instance, after the light is guided along path 49a, it passes shutter gap 60 which is now open, and is incident upon blocked shutter gap 66 which deflects the light along path 51a to blocked shutter gap 68 which deflects it along path 51b to port 70. Finally, to direct the light out the fourth port 72, blocked shutter gap 54 would deflect the light along path 49a. None of the shutters gaps will be blocked, which causes the light to exit directly out port 72.

Figure 5A:
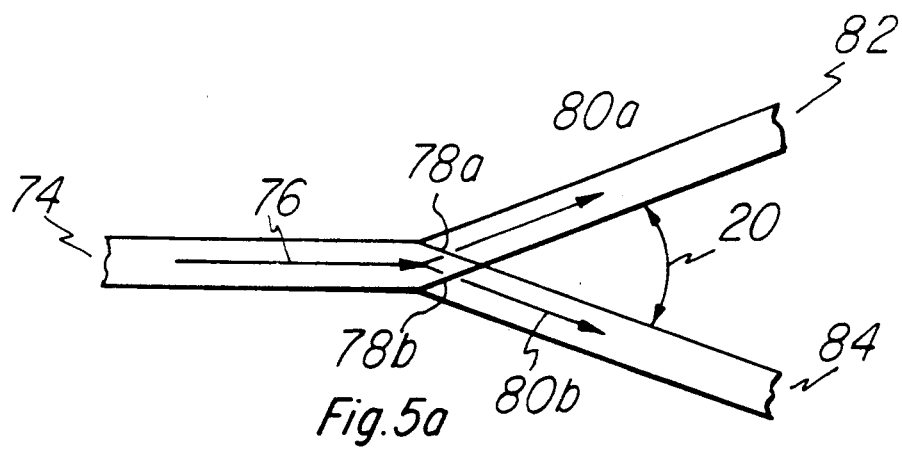
FIGS. 5a-5d shows a Y-branching switch.

An alternative one input, two output configuration is shown in FIGS. 5a–5d. In FIG. 5a, the basic structure is shown. Instead of one of the output ports being in line with the input port, both are offset along the axis of the input port by angle 20. This structure has two shutter gaps, which offer more options for light direction. In FIG. 5a, the light enters port 74 and propagates in the direction of arrow 76. If shutter gaps 78a and 78b are open, the light would split and travel in the direction of the arrows 80a and 80b, exiting out port 82 and 84 respectively. The ratio of light that exits either port can be controlled as discussed above, by varying voltage that caused the distance the shutter is lowered to be controlled.

Figure 5B:
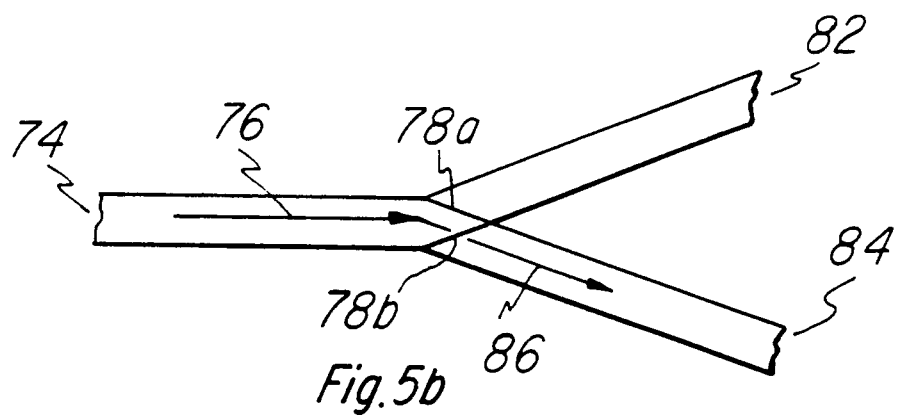
Figure 5C:
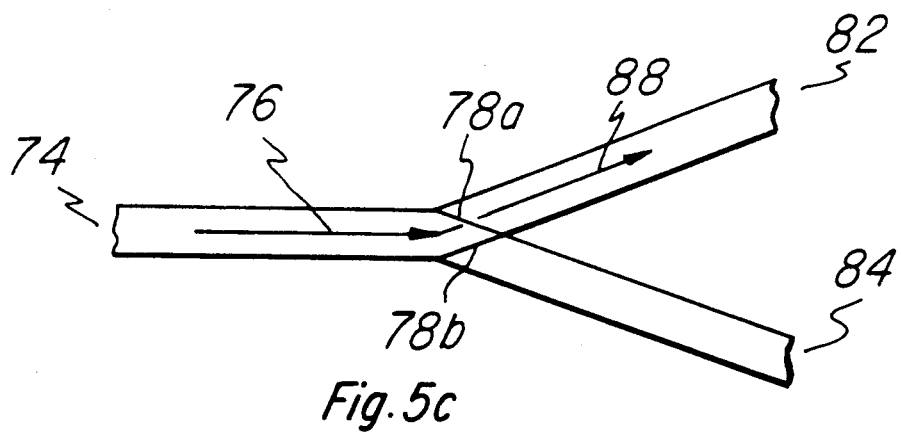
Figure 5D:
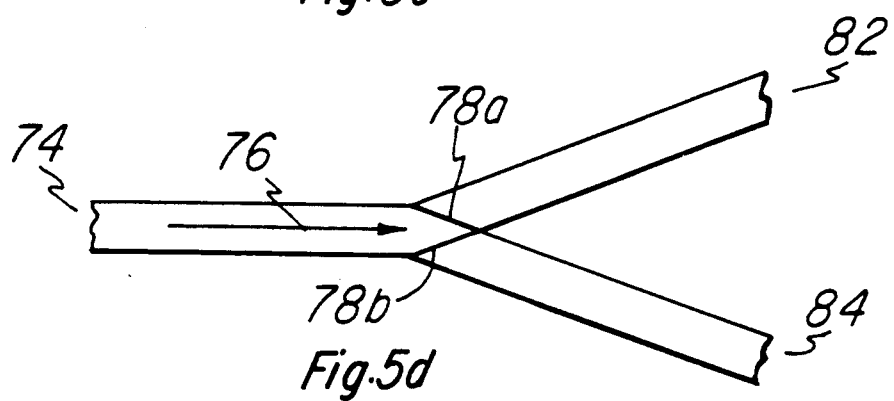

In FIG. 5b, shutter gap 78a is blocked and shutter gap 78b is open. The light enters port 74, propagating in the direction of arrow 76 until it contacts the blocked shutter gap 78a. At that instant the light is then guided through open shutter gap 78b and along arrow 86 out port 84. Again the amount of light actually exiting could be controlled by the amount of blocking of shutter gap 78b. In FIG. 5c, the opposite shutter configuration is shown. Shutter gap 78a is open, and shutter gap 78b is blocked. In this case the light enters port 74 and would be directed along path 88 out port 82. Finally, if both shutter gaps are blocked, any light entering port 74 would be reflected and no light would exit either port 82 or 84.

Figure 6:
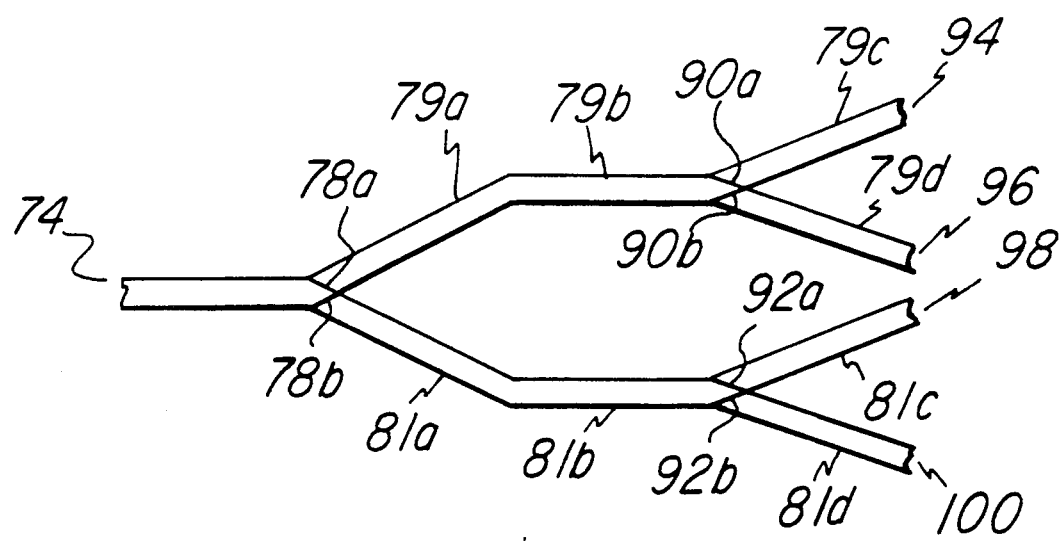
FIG. 6 shows a one-to-four splitter.

In FIG. 6, two additional Y-structures have been connected to the output ports of another Y-structure. Light could then either be completely directed out of one of the four ports, or split among the four ports forming a 1-to-4 beam splitter. Light entering port 74 could split through shutter gaps 78a and 78b and travel along the two paths 79a and 81a to paths 79b and 81b respectively. If both shutter gaps 90a and 90b are open on the upper path 79b, the light would again be split and exit along paths 79c and 79d out ports 94 and 96. If both shutter gaps 92a and 92b are open on the lower path 81b, the light would again split and travel along paths 81c and 81d and exit ports 98 and 100 also. Additionally, the light could be directed completely out any of the ports, or split between any two or any three ports with the proper selection of shutters to be lowered.

Figure 7:
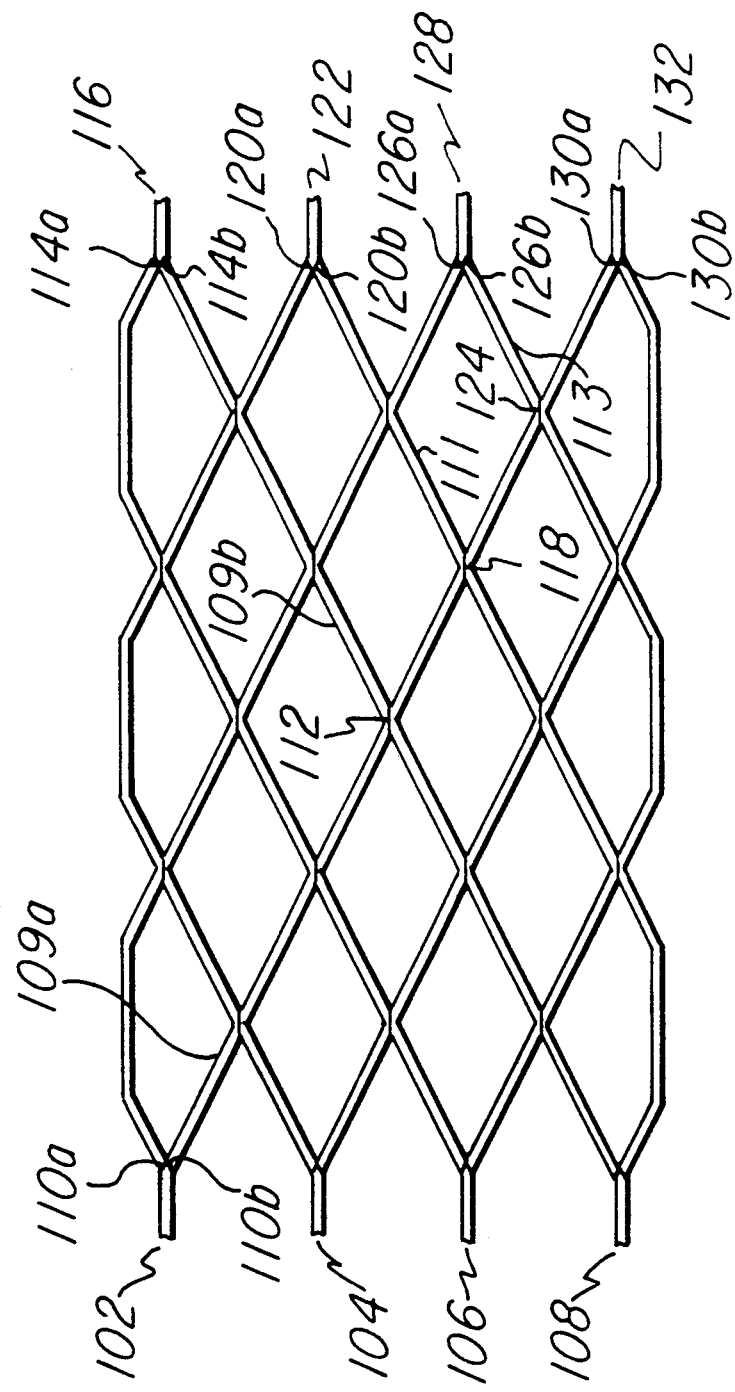
FIG. 7 shows another example of a switching network.

In FIG. 7, the Y-structure from FIGS. 5a–5d has been connected in a network with the crossing structure from FIG. 2. Again, by the proper selection of shutter in one of many possible combinations, the light entering any one of the ports 102, 104, 106, or 108, can be directed out any port 116, 122, 128 or 132. Additionally, the light could be split among any two or three, or among all four ports. For example, light entering port 102 could be guided along path 109a by the selection of shutter gap 110a for blocking, leaving shutter gap 110b in open. The light would then propagate in the same direction as path 109a until it contacted the next blocked shutter gap 112, which would cause the light to travel along path 109b. The light would stay in the direction 109b until it was incident upon blocked shutter gap 114a which is lowered and travel through open shutter gap 114b out port 116.

Similarly, the light could be directed out port 122, if the initial part of the above discussion were followed until shutter gap 112. Shutter gap 112 would be opened to allow the light to continue in the direction of path 109a until it contacted blocked shutter gap 124 which directs the light along path 111. The light would then travel up to blocked shutter gap 120a, deflecting it through opened shutter gap 120b out port 122. To direct the light out port 128, the shutter gap 118 would be left open and shutter gap 124 would be selected. This would direct the light along path 113 to blocked shutter gap 126a, through opened shutter gap 126b and out port 128. Finally, the light could be directed out port 132 by leaving all of the shutter gaps between shutter gap 110a and 130b in the open position. By blocking shutter gap 130b, the light would be directed out port 132. Again, it is possible to direct the light along many different paths to achieve the same effects, but the above discussion is intended to demonstrate the adaptability of the network. Additionally, the gaps could be positioned directly accrosee the incoming waveguide ports to allow individual control of every port.

The advantages of these type of devices are numerous. As discussed above, they allow for many different possibilities in light direction. They are manufactured monolithically. The electrodes are formed on the substrate in predetermined positions. The waveguide sheaths and core are then formed over the electrodes. A layer of organic spacer is then coated on top of the waveguide structure and patterned. The metal to form the metal elements, hinges, and shutters is then deposited, patterned and etched. Finally, the organic spacer is removed to allow the metal elements freedom of movement. The resultant structure has the metal shutters positioned over gaps formed in the waveguides, with an electrode underneath the metal element to allow it to be addressed.

Due to the way these are manufactured, they are less expensive, smaller and faster than previous optical switches. The switching time to deflect the mirrors is approximately 10 μsec. This makes the time for reconfiguring extremely short. Also, the relative ease of manufacture leads to a high yield rate and less resources are wasted.

Thus, although there has been described to this point a particular embodiment for a switching device, it is not intended that such specific references be considered as limitations upon the scope of this invention except in-so-far as set forth in the following claims.

What is claimed is:
1. A switching device comprising:
   a. a substrate;
   b. a waveguide structure upon said substrate comprising at least one input port and one output port, said waveguide structure having at least one gap in said waveguide located between said input port and said output port;
   c. a metal element located above said gap suspended from at least one hinge, said metal element further comprising a vertical metal structure attached to the underside of said metal element; and
   d. at least one electrode located adjacent said gap, operable to be electrically addressed and cause the deflection of said metal element and vertical metal structure.

2. The structure of claim 1 wherein there are two input ports and two output ports, such that the position of said vertical metal structure determines which output port any light entering through either of said input port said light exits.

3. The structure of claim 1 wherein there is one input port and two output ports, such that one of said output ports is on the same axis as said input port.

4. The structure of claim 1 wherein there is one input port and two output ports, such that both of said output ports are off set from the axis of said input port by a given angle from said axis.

5. A switching device comprising:
   a. a substrate;
   b. a waveguide structure upon said substrate comprising at least one input port and one output port, said waveguide structure having at least one gap in said waveguide located between said input port and said output port;
   c. an electrostatically deflectable element located proximate to said gap attached to at least one hinge, said deflectable element further comprising a reflective structure attached to said deflectable element; and
   d. at least one electrode located adjacent said gap, operable to be electrically addressed and cause the deflection of said electrostatically deflectable element and said reflective structure.

6. The structure of claim 5 wherein said reflective structure is attached to the underside of said electrostatically deflectable element.

7. The structure of claim 5 wherein said reflective structure comprises metal.

8. The structure of claim 5 wherein said electrostacially deflectable element comprises metal.

* * * * *